(12) United States Patent
Wang et al.

(10) Patent No.: US 11,208,124 B2
(45) Date of Patent: Dec. 28, 2021

(54) FOLLOW-UP MECHANISM AND BRAKE CALIPER UNIT FOR GAUGE-CHANGEABLE BOGIE

(71) Applicant: CRRC QINGDAO SIFANG ROLLING STOCK RESEARCH INSTITUTE CO., LTD., Qingdao (CN)

(72) Inventors: Zhen Wang, Qingdao (CN); Qingyu Meng, Qingdao (CN); Lingjun Wang, Qingdao (CN); Xiaochao Dai, Qingdao (CN); Xin Zhang, Qingdao (CN); Fengzhou Wang, Qingdao (CN); Jiansong Huang, Qingdao (CN); Fangliang Zhang, Qingdao (CN); Shiwei Huang, Qingdao (CN)

(73) Assignee: CRRC QINGDAO SIFANG ROLLING STOCK RESEARCH INSTITUTE CO., LTD. (CN), Qingdao (CN)

( * ) Notice: Subject to any disclaimer, the term of this patent is extended or adjusted under 35 U.S.C. 154(b) by 0 days.

(21) Appl. No.: 16/876,969

(22) Filed: May 18, 2020

(65) Prior Publication Data
US 2021/0331722 A1 Oct. 28, 2021

Related U.S. Application Data

(63) Continuation of application No. PCT/CN2018/124309, filed on Dec. 27, 2018.

(30) Foreign Application Priority Data

Mar. 16, 2018 (CN) .......................... 201810219931.9

(51) Int. Cl.
B61H 5/00 (2006.01)
B61H 9/00 (2006.01)
(Continued)

(52) U.S. Cl.
CPC .............. *B61H 5/00* (2013.01); *B60T 17/228* (2013.01); *B61H 9/00* (2013.01); *F16D 65/0056* (2013.01);
(Continued)

(58) Field of Classification Search
CPC ......... B61F 7/00; B61H 9/00; F16D 65/0056; F16D 55/2245
See application file for complete search history.

(56) References Cited

FOREIGN PATENT DOCUMENTS

| CN | 1357487 A | 7/2002 |
|---|---|---|
| CN | 104955688 A | 9/2015 |

(Continued)

OTHER PUBLICATIONS

International Search Report for PCT/CN2018/124309.
Search Report for CN201810219931.9.

*Primary Examiner* — Melanie Torres Williams
(74) *Attorney, Agent, or Firm* — J.C. Patents

(57) ABSTRACT

The present application relate to a follow-up mechanism and a brake caliper unit for gauge-changeable bogie, the follow-up mechanism includes a follow-up connector, unlocking members that are located on two sides of the follow-up connector and movably connected to the follow-up connector, a transverse displacement recognition device movably connected to the unlocking members, a toothed locking and positioning device mounted on the follow-up connector, and at least two mutually parallel fixation members; the follow-up connector is in sliding fit with the fixation members, and sliders are fixedly connected at ends of the unlocking members; the toothed locking and positioning device is movably connected to the transverse displacement recognition device and fixation members, respectively; the brake caliper unit comprises a mounting bracket, the follow-up mechanism, and a brake actuator mounted on the mounting (Continued)

bracket, the follow-up mechanism is installed in cooperation with the brake actuator, and the fixation members are fixedly mounted on the mounting bracket. The present application can automatically recognize the orbit change of a train, the follow-up mechanism moves with a wheel by means of its stored elastic force and the unlocking members, and can self-locked at the target gauge position, thus realizing the change in position.

14 Claims, 10 Drawing Sheets

(51) Int. Cl.
    *B60T 17/22*     (2006.01)
    *F16D 65/00*     (2006.01)
    *F16D 55/00*     (2006.01)
    *B61F 7/00*     (2006.01)
    *F16D 55/224*     (2006.01)

(52) U.S. Cl.
    CPC ............ *B61F 7/00* (2013.01); *F16D 55/2245* (2013.01); *F16D 2055/0008* (2013.01)

(56) References Cited

FOREIGN PATENT DOCUMENTS

| | | | | |
|---|---|---|---|---|
| CN | 104986287 A | 10/2015 | | |
| CN | 105134828 A | 12/2015 | | |
| CN | 105365842 A | 3/2016 | | |
| CN | 106585882 A | 4/2017 | | |
| CN | 107521519 A | 12/2017 | | |
| CN | 107757652 A | 3/2018 | | |
| CN | 108423027 A | 8/2018 | | |
| CN | 108482415 A | 9/2018 | | |
| DE | 2346828 A1 | * | 3/1975 | ............... B61H 5/00 |
| DE | 3940221 A1 | * | 6/1991 | ............... B61H 5/00 |
| DE | 4407293 C1 | * | 10/1995 | ......... F16D 55/2245 |
| EP | 0324911 A2 | * | 7/1989 | ............. F16D 65/56 |
| EP | 0499971 A2 | * | 8/1992 | ......... F16D 55/2245 |
| ES | 353542 A1 | 10/1969 | | |
| FR | 665173 A | 9/1929 | | |
| GB | 509717 A | 7/1939 | | |
| KR | 20100039035 A | 4/2010 | | |
| WO | WO-2016113484 A1 | * | 7/2016 | ............ B60T 13/665 |

* cited by examiner

FOLLOW-UP MECHANISM AND BRAKE CALIPER UNIT FOR GAUGE-CHANGEABLE BOGIE

CROSS-REFERENCE TO RELATED APPLICATION

This application is a continuation application of international Application No. PCT/CN2018/124309, filed on Dec. 27, 2018, which in turn claims the priority benefits of Chinese Patent Application No. 201810219931.9, filed on Mar. 16, 2018. The contents of the above identified applications are incorporated herein by reference in their entirety.

TECHNICAL FIELD

The present application belongs to the technical field of rail vehicle braking, and relates to a brake device for rail vehicles and particularly to a follow-up mechanism and brake caliper unit for a gauge-changeable bogie.

BACKGROUND OF THE PRESENT INVENTION

Among the basic brake devices in the field of railway traffic, disc-type brake devices are usually called brake caliper units. The brake caliper units mainly include two structures, i.e., a three-point mounting structure and a compact four-point mounting structure. The above mentioned structures of the brake caliper units are in common that they are fixed at lifting positions. The brake caliper units are fixed relative to the bogie after being mounted. Such brake caliper units have been extensively used in China and foreign countries. The relative displacement between the whole brake caliper unit and the brake disc substantially remains unchanged when in use.

With the development of internationalization in the world and in accordance with the requirements of integration with the world, the rail links among countries gradually become closer. However, due to the difference in track gauge among countries, it is extremely inconvenient for railway operation. The problem of different gauges is solved by gauge-changeable bogies that can realize the running of rail lines of different countries and different gauges, without requiring passengers to transfer trains. Since the change in gauge leads to the change of the distance between wheels, it becomes a difficult problem whether the brake device on the wheels can adapt to the change in the wheels. To solve this problem, a floating brake caliper unit has been proposed in Japan. However, due to the large change in gauge, the transverse floating clearance is large, and the transverse impact acceleration of train is high when running at a high speed, so that the brake caliper unit produces a large impact to the wheels. This impact will cause hidden dangers to the running safety of the train, resulting in poor train operation safety.

SUMMARY OF THE PRESENT INVENTION

The present application provides a follow-up mechanism and a brake caliper unit for gauge-changeable bogie.

The present application provides a follow-up mechanism, comprising a follow-up connector, unlocking members that are located on two sides of the follow-up connector and movably connected to the follow-up connector, a transverse displacement recognition device movably connected to the unlocking members, a toothed locking and positioning device mounted on the follow-up connector, and at least two mutually parallel fixation members; the follow-up connector is in sliding fit with the fixation members, and sliders are fixedly connected at ends of the unlocking members; the transverse displacement recognition device comprises a transverse movement unlocking member and two displacement recognizing and balancing elastic members symmetrically mounted on the follow-up connector; the toothed locking and positioning device comprises a toothed locking element movably connected to the transverse movement unlocking member and a positioning element connected to the toothed locking element; the toothed locking element is movably connected to a first fixation member of the parallel fixation members, and the positioning element is movably connected to a second fixation member of the fixation members.

Preferably, two ends of the transverse movement unlocking member are in slider hinge connection with or in cam connection with a first unlocking member and a second unlocking member of the unlocking members, respectively; a first displacement recognizing and balancing elastic member of the displacement recognizing and balancing elastic members is in slider hinge connection with or in cam connection with the first unlocking member; and a second displacement recognizing and balancing elastic member of the displacement recognizing and balancing elastic members is in slider hinge connection with or in cam connection with the second unlocking member.

Preferably, the toothed locking element comprises an unlocking gear shaft in cam connection with the transverse movement unlocking member and a fixed gear shaft system meshed with the unlocking gear shaft; the first fixation member is a fixation member with a rack; the fixed gear shaft system is meshed with the first fixation member.

Preferably, the positioning element comprises an unlocking positioning member fixedly connected to the unlocking gear shaft and a locking elastic member connected to the unlocking positioning member, the second fixation member is a fixation member with a positioning hole, the unlocking positioning member is in cam connection with the second fixation member.

The follow-up mechanism further comprises an automatic centering device, the automatic centering device comprises slide portions located on two sides of the follow-up connector and movably connected to the follow-up connector, balancing elastic members symmetrically mounted on the follow-up connector, and at least two mutually parallel fixation members; a first balancing elastic member of the balancing elastic members is movably connected to a first slide portion of the slide portions, a second balancing elastic member of the balancing elastic members is movably connected to a second slide portion of the slide portions; the fixation members of the automatic centering device is in sliding fit with the follow-up connector.

The present application additionally provides a brake caliper unit for gauge-changeable bogie comprising a mounting bracket, a follow-up mechanism and a brake actuator, the brake actuator is mounted on the mounting bracket, the follow-up mechanism comprises a follow-up connector, unlocking members that are located on two sides of the follow-up connector and movably connected to the follow-up connector, a transverse displacement recognition device movably connected to the unlocking members, a toothed locking and positioning device mounted on the follow-up connector, and at least two mutually parallel fixation members, the follow-up connector is installed in cooperation with the brake actuator, the fixation members are fixedly mounted on the mounting bracket.

The present application also provides a brake caliper unit for gauge-changeable bogie comprising a mounting bracket, a follow-up mechanism and a brake actuator, the brake actuator is mounted on the mounting bracket, the follow-up mechanism comprising a follow-up connector, unlocking members that are located on two sides of the follow-up connector and movably connected to the follow-up connector, a transverse displacement recognition device movably connected to the unlocking members, a toothed locking and positioning device mounted on the follow-up connector, an automatic centering device, and at least two mutually parallel fixation members, the follow-up connector is installed in cooperation with the brake actuator, the fixation members of the follow-up mechanism are fixedly mounted on the mounting bracket, the slide portions are movably connected to the brake pad devices.

Compared with the prior art, the present application has the following advantages and positive effects.

(1) In the follow-up mechanism provided by the present application, a transverse displacement recognition mechanism and a toothed locking and positioning device are provided. The orbit change of a train can be automatically recognized by the transverse displacement recognition device. The toothed locking and positioning device is activated, and the follow-up mechanism moves with a wheel by means of its own internal force. When the follow-up mechanism moves to a target gauge position, the follow-up mechanism is self-locked at the target gauge position by the toothed locking and positioning device, thus realizing the change in position. It is suitable for a variety of brake caliper units.

(2) The transverse displacement recognition mechanism that is functionally independent is used in the follow-up mechanism provided by the present application. During the normal running of a train, the rim never comes into contact with the transverse displacement recognition mechanism, and the transverse displacement recognition mechanism only comes into contact with the rim on the orbit change line and does not act on the toothed locking and positioning device during the running process, so that the reliability of the normal running is ensured.

(3) In the follow-up mechanism provided by the present application, a toothed locking and positioning device is provided, the follow-up mechanism can be locked at any working position to limit its transverse movement. Accordingly, the follow-up mechanism can bear a large impact load, and the running safety of the train is improved.

(4) In the follow-up mechanism provided by the present application, the toothed locking and positioning device is an unlocking shaft. After being unlocked, the follow-up mechanism is always in an unlocked state during its transverse displacement along with the wheel, so that smooth movement of the follow-up mechanism is ensured.

(5) In the follow-up mechanism provided by the present application, an automatic centering device is provided, so that the follow-up mechanism is symmetrical about the center of the brake disc. In a relief state, the clearance between the brake pads and the brake disc can be equalized, avoiding a state where the brake pads always come into contact with one side of the brake disc. The automatic centering mechanism can also keep the brake pads and the brake disc always in a balanced state, so that the rotation of the brake pads is limited and the eccentric wear of the brake pads can be effectively reduced.

(6) The automatic centering device in the follow-up mechanism provided by the present application can also compensate the error resulted from the inaccurate position after movement, so that the toothed locking and positioning device is locked at the accurate position.

(7) The brake caliper unit provided by the present application uses a follow-up mechanism comprising a transverse displacement recognition mechanism and a toothed locking and positioning device. The orbit change of a train can be automatically recognized by the transverse displacement recognition device. The toothed locking and positioning device is activated, and the follow-up mechanism moves with a wheel by means of its stored elastic force and the unlocking members. When the follow-up mechanism moves to a target gauge position, the follow-up mechanism is self-locked at the target gauge position by the toothed locking and positioning device, so as to realize the change in position. During the normal running of the train, the rim never comes into contact with the transverse displacement recognition device, and the transverse displacement recognition device only comes into contact with the rim on the orbit change line and does not act on the toothed locking and positioning device during the running process, so that the reliability of the normal running is ensured. The brake caliper unit is locked at any operating position by the toothed locking and positioning device, so that the brake caliper unit can bear a large impact load, and the running safety of the train is improved.

(8) The brake caliper unit provided by the present application uses a follow-up mechanism, and an automatic centering device is further provided in the follow-up mechanism, so that the brake caliper unit is symmetrical about the center of the brake disc. In a relief state, the clearance between the brake pads and the brake disc can be equalized, avoiding a state where the brake pads always come into contact with one side of the brake disc. The automatic centering mechanism can also keep the brake pads and the brake disc always in a balanced state, so that the rotation of the brake pads is limited and the eccentric wear of the brake pads can be effectively reduced. The automatic centering device can also compensate the error resulted from the inaccurate position after movement, so that the toothed locking and positioning device is locked at the accurate position.

BRIEF DESCRIPTION OF THE DRAWINGS

FIG. 19 is a three-dimensional structure diagram of follow-up mechanism viewed from the bottom in accordance with one embodiment of the present application; in which:

Figure 1:
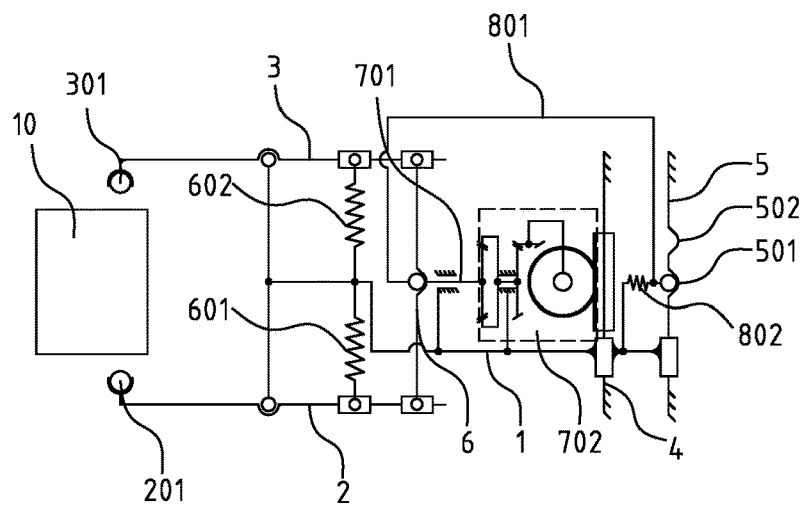
FIG. 1 is a structure diagram of a follow-up mechanism in accordance with one embodiment of the present application.

1: follow-up connector; 101: first longitudinal hole; 102: second longitudinal hole; 103: first slide hole; 104: second slide hole; 105: third slide hole; 106: fourth slide hole; 2: first unlocking member; 201: first slider; 3: second unlocking member; 301: second slider; 4: first fixation member; 5: second fixation member; 501: first positioning hole; 502: second positioning hole; 6: transverse movement unlocking member; 601: first displacement recognizing and balancing elastic member; 602: second displacement recognizing and balancing elastic member; 701: unlocking gear shaft; 702: fixed gear shaft system; 703: pin shaft; 801: unlocking positioning member; 802: locking elastic member; 901: first balancing elastic member; 902: second balancing elastic member; 903: first slide portion; 904: second slide portion; 905: third fixation member; 906: fourth fixation member; 907: first brake pad device; 908: second brake pad device; 10: wheel; 11: brake disc; 12: mounting bracket: 13: brake actuator.

DETAILED DESCRIPTION OF THE PRESENT INVENTION

In the following, the present application will be described in detail through exemplary implementations. However, it should be understood, without further recitation, the elements, structure and features in one implementation may be beneficially combined in other implementations without further recitation.

In the description of the present application, it is to be noted that the direction or positional relationships indicated by terms "upper", "lower", "left", "right", and the like are based on the positional relationships in the drawings; these terms are merely used to facilitate the description of the present application and simplify the description, yet do not indicate or imply that the devices or elements referred must have a particular orientation, be constructed and operated in particular orientation, and therefore should not be interpreted as a limitation on this application. In addition, terms "first", "second", "third", "fourth" are used for descriptive purposes and should not be interpreted to indicate or imply the relative importance.

In addition, it also should be noted that, in the attached drawings, FIGS. 1, 4-9b, and 12-13 only show the structural schematics of the corresponding components, and should not be interpreted as a limit to actual size of the components and relative position between the assemblies of the parts.

In addition, in this document, "transverse" means a direction perpendicular to the wheel travel direction, while "longitudinal" means a direction parallel to the wheel travel direction.

The present application provides a follow-up mechanism, comprising a follow-up connector, unlocking members that are located on two sides of the follow-up connector and movably connected to the follow-up connector, a transverse displacement recognition device movably connected to the unlocking members, a toothed locking and positioning device mounted on the follow-up connector, and at least two mutually parallel fixation members. The follow-up connector is in sliding fit with the fixation members, and sliders are fixedly connected at ends of the unlocking members. The transverse displacement recognition device comprises a transverse movement unlocking member and two displacement recognizing and balancing elastic members symmetrically mounted on the follow-up connector. The toothed locking and positioning device comprises a toothed locking element movably connected to the transverse movement unlocking member and a positioning element connected to the toothed locking element. The toothed locking element is movably connected to a first fixation member of the at least two mutually parallel fixation members, and the positioning element is movably connected to a second fixation member of the at least two mutually parallel fixation members.

The follow-up mechanism provided by the present application is located in front or rear of the wheels travel direction as a whole. The orbit change of a train can be recognized by the unlocking members in the transverse displacement recognition device. Rely on the elastic force of the elastic members inside the transverse displacement recognition device and the coordination of the other components, the toothed locking and positioning device is activated, and the follow-up mechanism moves with the wheels. When the follow-up mechanism moves to a target gauge position, the follow-up mechanism is self-locked at the target gauge position by the toothed locking and positioning device, so as to realize the change in position. The follow-up mechanism can withstand greater impact during train operation, thereby improving the safety of train operation.

Embodiment 1

Figure 2:
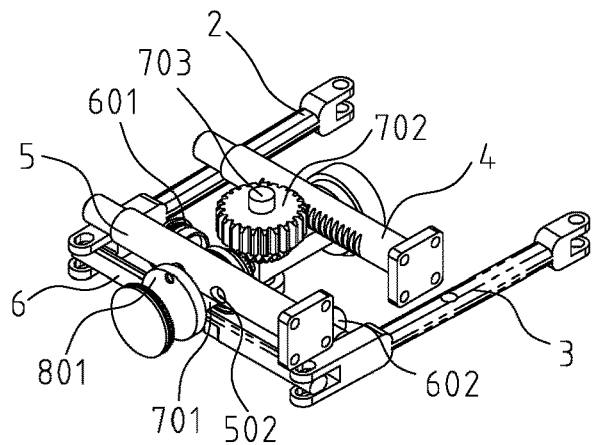
FIGS. 2 and 3 are inner structure diagrams of a follow-up mechanism in accordance with one embodiment of the present application.
Figure 3:
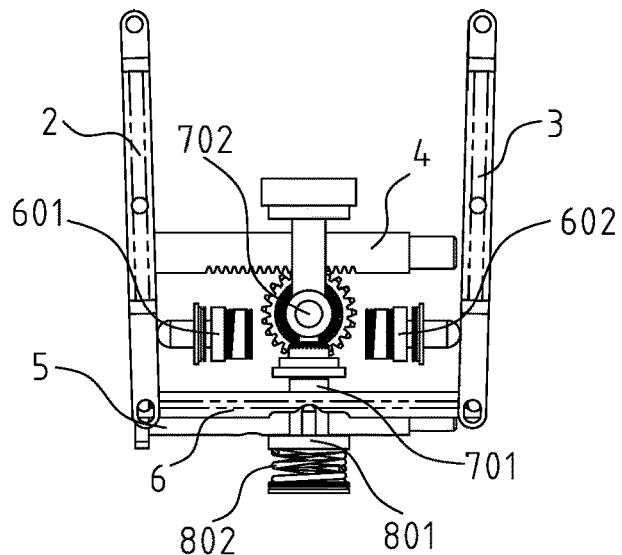

With reference to FIGS. 1, 2 and 3, an embodiment of the present application provides a follow-up mechanism, comprising a follow-up connector 1, a first unlocking member 2 and a second unlocking member 3 that are located on two sides of the follow-up connector 1 and movably connected to the follow-up connector 1 respectively, a transverse displacement recognition device movably connected to the first unlocking member 2 and the second unlocking member 3, a toothed locking and positioning device mounted on the follow-up connector 1, and two mutually parallel fixation members. The fixation members are denoted as a first fixation member 4 and a second fixation member 5, respectively. The follow-up connector 1 is in sliding fit with the first fixation member 4 and the second fixation member 5, respectively. A first slider 201 is fixedly connected at an end of the first unlocking member 2, and a second slider 301 is fixedly connected at an end of the second unlocking member 3. The first slider 201 and the second slider 301 are in contact with a wheel 10 in a lateral direction during the wheel gauge change process.

In this embodiment, the follow-up connector 1 functions to connect the unlocking members, the toothed unlocking and positioning device and the fixation members. Thus, during the unlocking or locking process of the follow-up mechanism, the follow-up connector 1 can move along with the activation of the corresponding component so as to drive other associated components to move. As a result, the position of the follow-up mechanism is changed to adapt to the gauge of the wheel after orbit change.

Preferably, the first unlocking member 2 and the second unlocking member 3 substantially extend in a longitudinal direction, and the first fixation member 4 and the second fixation member 5 substantially extend in a transverse direction.

Figure 10:
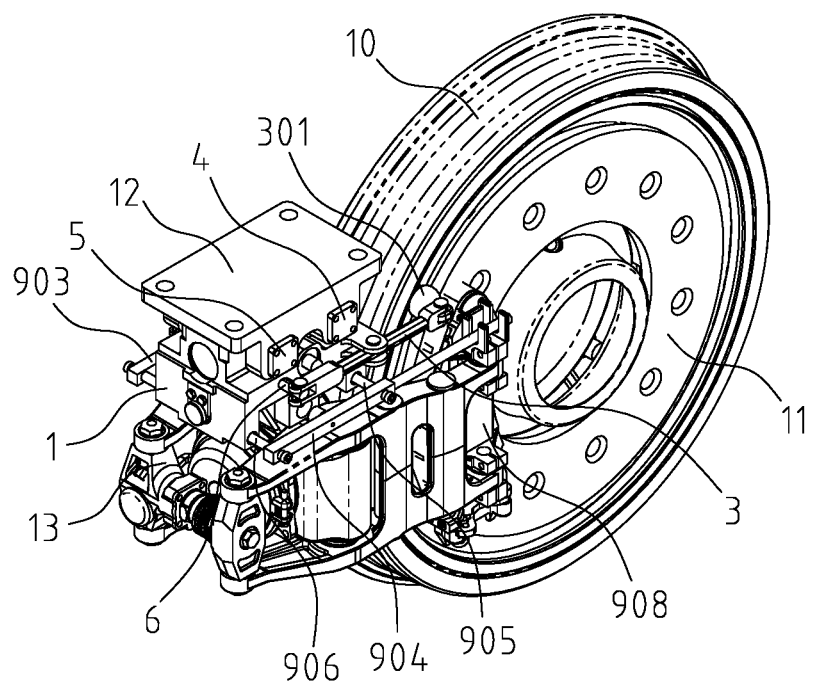
FIGS. 10 and 11 are structure diagrams of a brake caliper unit for a gauge-changeable bogie of the present application.

In this embodiment, "movably connected" should be interpreted that the components may be rotatably connected relative to each other. Specifically, the first unlocking member 2 and the second unlocking member 3 being movably connected to the follow-up connector 1 respectively means that: the first unlocking member 2 and the second unlocking member 3 are connected to the follow-up connector 1 in such a way that the first unlocking member 2 and the second unlocking member 3 are rotatable relative to the follow-up connector 1. With reference to FIG. 10, by taking the second unlocking member 3 as an example, if the wheel 10 changes orbit rightward, the second unlocking member 3 rotates clockwise in the horizontal plane of the second unlocking member 3 about the joint thereof with the follow-up connector 1 from its initial position, when viewed from the top.

Figure 16:
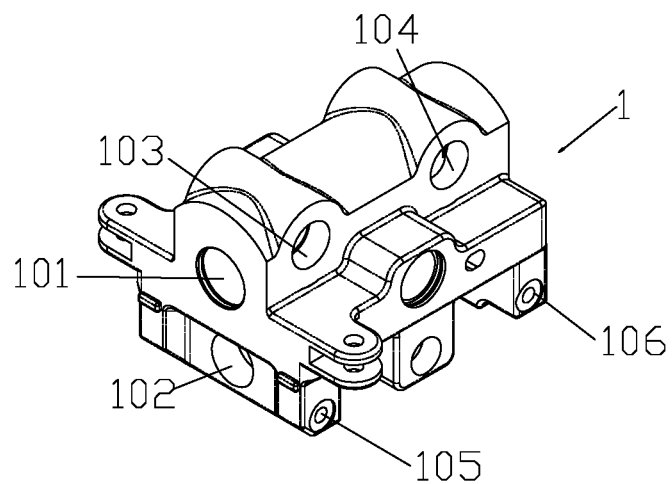
FIG. 16 is a three-dimensional diagram of a follow-up connector in accordance with one embodiment of the present application.

In this embodiment, the follow-up connector 1 being in sliding fit with the first fixation member 4 and the second fixation member 5 respectively means that: the follow-up connector 1 is in fit with the first fixation member 4 and the second fixation member through a slide shaft, so that the follow-up connector 1 can slide transversely on the first fixation member 4 and the second fixation member 5. Specifically, with reference to FIGS. 10 and 16, by taking the first fixation member 4 as an example, the first fixation member 4 is located in a pair of first slide holes 103 on the upper of the follow-up connector 1 (for clarity, only one first slide hole 103 is shown in FIG. 16), and the follow-up connector 1 can slide transversely on the first fixation member 4 during the movement of the follow-up mechanism along with the wheel.

The transverse displacement recognition device includes a transverse movement unlocking member 6 and two displacement recognizing and balancing elastic members symmetrically mounted on the follow-up connector 1. The displacement recognizing and balancing elastic members are denoted as a first displacement recognizing and balancing elastic member 601 and a second displacement recognizing and balancing elastic member 602, respectively. The toothed locking positioning device includes a toothed locking element movably connected to the transverse movement unlocking member 6 and a positioning element connected to the toothed locking element. The toothed locking element is movably connected to the first fixation member 4 so that the follow-up connector 1 is driven by unlocking or locking of the toothed locking element, so as to drive the follow-up mechanism to move. The positioning element is movably connected to the second fixation member 5 to realize the unlocking or locking of the toothed locking element.

Preferably, the first displacement recognizing and balancing elastic member 601 and the second displacement recognizing and balancing elastic member 602 substantially extend in the transverse direction.

With continued reference to FIGS. 1, 2 and 3, to realize the movable connection of the unlocking members with the follow-up connector, the transverse movement unlocking member and the displacement recognizing and balancing elastic members, the follow-up connector 1 is hinged to the first unlocking member 2 and the second unlocking member 3, respectively; two ends of the transverse movement unlocking member 6 are in slider hinge connection with or in cam connection with the first unlocking member 2 and the second unlocking member 3, respectively; the first displacement recognizing and balancing elastic member 601 is in slider hinge connection with or in cam connection with the first unlocking member 2; and the second displacement recognizing and balancing elastic member 602 is in slider hinge connection with or in cam connection with the second unlocking member 3. During the movement of the follow-up mechanism along with the wheel, a rim pushes the first slider 201 and the first unlocking member 2 (or the second slider 301 and the second unlocking member 3) to rotate about the follow-up connector 1, the first displacement recognizing and balancing elastic member 601 (or the second displacement recognizing and balancing elastic member 602) is compressed, and the transverse movement unlocking member 6 moves in a direction opposite to the movement direction of the wheel under the action of the first unlocking member 2 (or the second unlocking member 3). At this time, the transverse movement unlocking member 6 pushes the second unlocking member 3 (or the first unlocking member 2) to rotate, and the second displacement recognizing and balancing elastic member 602 (or the first displacement recognizing and balancing elastic member 601) is stretched.

In this embodiment, the "slider hinge or cam connection" means that by this connection the rotatable connection between the associated components can be realized.

Preferably, the first unlocking member 2 and the second unlocking member 3 are rod structures, and are arranged in parallel.

Preferably, one end of the first unlocking member 2 is a first slider 201 in contact with the wheel 10, the other end thereof is in slider hinge connection with or in cam connection with one end of the transverse movement unlocking member 6, and a rod portion thereof is hinged to the follow-up connector 1 at a certain position.

Preferably, one end of the second unlocking member 3 is a second slider 301 in contact with the wheel 10, the other end thereof is in slider hinge connection with or in cam connection with one end of the transverse movement unlocking member 6, and a rod portion thereof is hinged to the follow-up connector 1 at a position corresponding to the hinged position of the first unlocking member 2.

With the above structure, when the wheel change orbit, the rim pushes the first slider 201 and the first unlocking member 2 (or the second slider 301 and the second unlocking member 3) to rotate about the hinged joint of the follow-up connector 1, so that the transverse movement unlocking member 6 connected to the unlocking member moves transversely in a direction opposite to the movement direction of the wheel.

As described above, it should be understood that, in this embodiment, one end of the first displacement recognizing and balancing elastic member 601 is in slider hinge connection with or in cam connection with the first unlocking member 2, while the other end thereof is fixedly connected to the follow-up connector 1 through an elastic member (not shown in FIG. 2). One end of the second displacement recognizing and balancing elastic member 602 is in slider hinge connection with or in cam connection with the second unlocking member 3, while the other end thereof is fixedly connected to the follow-up connector 1 through an elastic member (not shown in FIG. 2).

Herein, it should be understood that, the way of fixedly connecting inner sides of the two displacement recognizing and balancing elastic members to the follow-up connector 1 may also be bonding, welding, etc. Other ways of fixedly connecting the displacement recognizing and balancing elastic members to the follow-up connector 1 may be feasible without departing from the gist of the present application.

Figure 14:
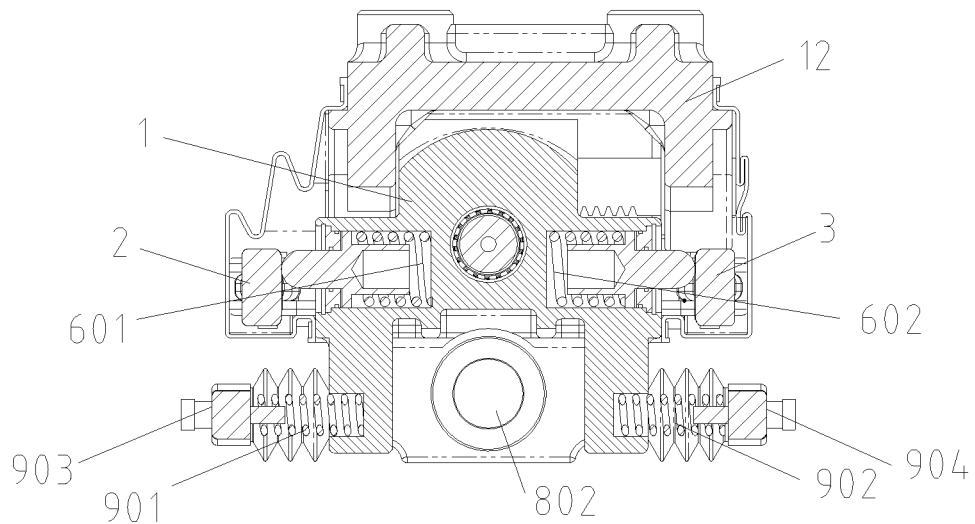
FIG. 14 is a partial cross-sectional diagram of a follow-up mechanism along transverse direction in accordance with one embodiment of the present application.

The connection way of the displacement recognizing and balancing elastic members specifically refers to FIG. 14. In FIG. 14, two grooves may be formed on two sides of the follow-up connector 1. The two grooves are located in the same horizontal plane in the height direction, and the axes of the two grooves are located on a same straight line in the transverse direction. The two displacement recognizing and balancing elastic members may be mounted in the two grooves, respectively. Outer ends of the two displacement recognizing and balancing elastic members are in slider hinge connection with or in cam connection with the unlocking members, while inner ends thereof are fixedly connected to the follow-up connector 1 through elastic members.

In addition, it should be understood that, the way of fixedly connecting inner sides of the two displacement recognizing and balancing elastic members to the follow-up connector 1 is not limited to the way shown in FIG. 14, as long as one end of each displacement recognizing and balancing elastic member can be mounted on the follow-up connector while the other end thereof can be in slider hinge connection with or in cam connection with the unlocking member.

With continued reference to FIGS. 1, 2 and 3, in order to realize the unlocking and locking of the follow-up mechanism during the orbit change process, make the follow-up mechanism move smoothly and capable of bearing a large load, the toothed locking element comprises an unlocking gear shaft 701 in cam connection with the transverse movement unlocking member 6 and a fixed gear shaft system 702 meshed with the unlocking gear shaft 701. The first fixation member 4 is a fixation member with a rack; the fixed gear shaft system 702 is meshed with the first fixation member 4, so that after the toothed locking element is unlocked, the fixed gear shaft system 702 is disengaged from the unlocking gear shaft 701, and the first fixation member 4 can move transversely and drive the fixed gear shaft system 702 to rotate through the meshing relationship with the fixed gear shaft system 702. The positioning element comprises an unlocking positioning member 801 fixedly connected to the unlocking gear shaft 701 and a locking elastic member 802 connected to the unlocking positioning member 801. The second fixation member 5 is a fixation member with a positioning hole. The unlocking positioning member 801 is in cam connection with the second fixation member 5; through the fitting of the positioning hole and a cam, the engagement of the unlocking positioning member 801 with the second fixation member 5 is realized, so as to realize the unlocking and locking of the toothed locking element.

Herein, it should be understood that the "unlocking" means that the related components can move relatively and the "locking" means that the related components cannot move relatively.

In this embodiment, the unlocking gear shaft 701, the fixed gear shaft system 702, the unlocking positioning member 801 and the locking elastic member 802 are all movably connected to the follow-up connector 1. It can be seen from FIG. 2 that these components are all arranged inside the follow-up connector 1. Therefore, it should be understood that the follow-up connector 1 structurally have grooves or bosses corresponding to the components of FIG. 2, so that these components are fixed by the grooves or bosses.

Specifically, with reference to FIGS. 2 and 16, the unlocking gear shaft 701 is arranged in a first longitudinal hole 101 and in clearance fit with the first longitudinal hole 101, so that the unlocking gear shaft 701 can move axially along the first longitudinal hole 101. The fixed gear shaft system 702 is located inside the follow-up connector 1, a pin shaft 703 is arranged in the center of the fixed gear shaft system 702, and two ends of the pin shaft 703 are hinged to the follow-up connector 1.

Similarly, with reference to FIGS. 2 and 16, the unlocking positioning member 801 is arranged in the first longitudinal hole 101 and in clearance fit with the first longitudinal hole 101, the unlocking positioning member 801 can move axially along the first longitudinal hole 101. The locking elastic member 802 is also arranged in the first longitudinal hole 101 and in clearance fit with the first longitudinal hole 101, so that the locking elastic member 802 can also move axially along the first longitudinal hole 101.

During the movement of the follow-up mechanism along with the wheel, the transverse movement unlocking member 6 allows the unlocking gear shaft 701 to move by the cam. The unlocking gear shaft 701 is disengaged from the fixed gear shaft system 702, the cam connection of the unlocking positioning member 801 and the second fixation member 5 is disconnected, and the locking elastic member 802 is compressed. After the unlocking gear shaft 701 is disconnected from the fixed gear shaft system 702, the toothed locking element enters unlocked state, and the first fixation member 4 can move transversely and drive the fixed gear shaft system 702 to rotate through the meshing relationship with the fixed gear shaft system 702. Therefore, the wheel moves continuously, the follow-up connector 1 can slide on the first fixation member 4 and the second fixation member 5, and the rack on the first fixation member 4 drives the fixed gear shaft system 702 to rotate to realize unlocking. After being unlocked, the follow-up mechanism is always in an unlocked state during its transverse displacement along with the wheel, so as to ensure the smooth movement of the follow-up mechanism. When the follow-up mechanism reaches a target gauge position, the unlocking gear shaft 701 is meshed with the fixed gear shaft system again to lock the follow-up mechanism at the target gauge position. Thus, the follow-up mechanism can bear a large impact load, and the running safety of the train is improved.

Specifically, during the orbit change of the wheel, the rim pushes the first slider 201 and the first unlocking member 2 (or the second slider 301 and the second unlocking member 3) to rotate about the follow-up connector 1, so that the transverse movement unlocking member 6 moves in a direction opposite to the movement direction of the wheel under the action of the first unlocking member 2 (or the second unlocking member 3). Meanwhile, since one end of each displacement recognizing and balancing elastic member (601 or 602) is in slider hinge connection with or in cam connection with the unlocking member while the other end thereof is fixedly connected to the follow-up connector 1, so the displacement recognizing and balancing elastic member 601 (or the second displacement recognizing and balancing elastic member 602) is stretched or compressed.

Subsequently, due to the displacement of the transverse movement unlocking member 6 in the transverse direction, the transverse movement unlocking member 6 drive the unlocking gear shaft 701 to move by the cam, so that the unlocking gear shaft 701 is disconnected from the fixed gear shaft system 702, the cam connection of the unlocking positioning member 801 fixedly connected to the unlocking gear shaft 701 and the second fixation member 5 is disconnected, and the locking elastic member 802 is compressed.

Finally, after the unlocking gear shaft 701 is disconnected from the fixed gear shaft system 702, the toothed locking member enters an unlocked state, the first fixation member 4 can move transversely, and the fixed gear shaft system 702 can rotate. With the continuous movement of the wheel 10, the follow-up connector 1 can slide on the first fixation member 4, and can also slide on the second fixation member 5.

Therefore, the unlocking of the follow-up mechanism is realized by the above steps, and the follow-up mechanism is always in the unlocked state during its displacement along with the wheel after it is unlocked. Thus, the follow-mechanism can move in the transverse direction in the unlocked state, and so as to ensure the smooth movement of the follow-up mechanism.

When the follow-up mechanism moves to a target gauge position, the unlocking gear shaft 701 is meshed with the fixed gear shaft system 702 again to lock the follow-up mechanism at the target gauge position, so that the follow-up mechanism is enter into a locked state. At this time, the follow-up mechanism cannot move in the transverse direction, so the follow-up mechanism can bear a large impact load, and the running safety of the train is improved.

In addition, it should be understood that the transmission way of the toothed locking element is not limited to the above forms; other forms without departing from the gist of the present application are also feasible. For example, the locking element may take the form of a shaft-end clutch, that is, a mating member coaxial with the unlocking gear shaft 701 is provided at an end of the unlocking gear shaft 701 and the first fixation member 4 is located above the mating member. Teeth are provided on a circumferential surface of the mating member, and the teeth on the circumferential surface of the mating member are meshed with the rack on the first fixation member 4, so that the mating member and the first fixation member 4 form a gear-rack structure.

Embodiment 2

Figure 4:
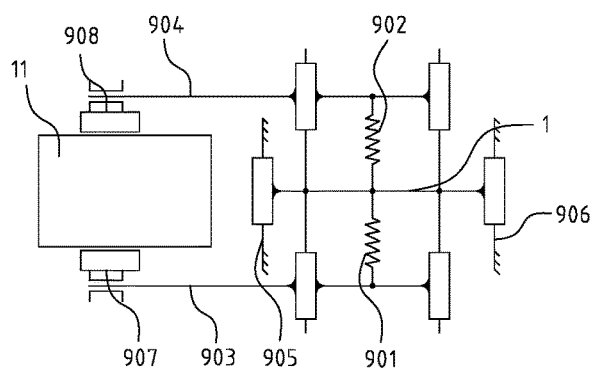
FIG. 4 is a structure diagram of an automatic centering device in a follow-up mechanism in accordance with another embodiment of the present application.
Figure 17:
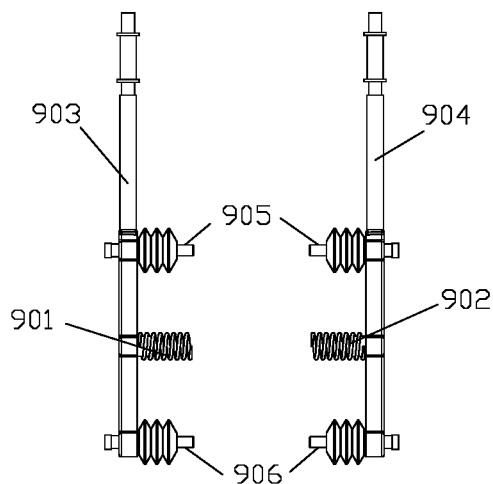
FIG. 17 is a structure diagram of an automatic centering device in accordance with one embodiment of the present application.
Figure 18:
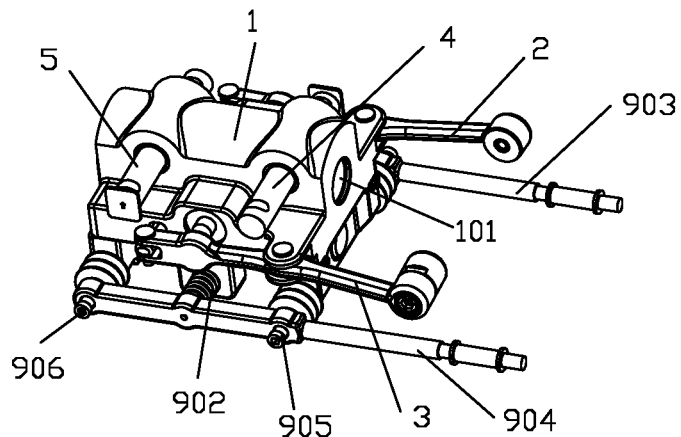
FIG. 18 is a three-dimensional structure diagram of follow-up mechanism in accordance with one embodiment of the present application.

With reference to FIGS. 1, 2, 3, 18 and 19, another embodiment of the present application provides a follow-up mechanism comprising a follow-up connector 1, a first unlocking member 2 and a second unlocking member 3 that are located on two sides of the follow-up connector 1 and movably connected to the follow-up connector 1 respectively, a transverse displacement recognition device movably connected to the first unlocking member 2 and the second unlocking member 3, a toothed locking and positioning device mounted on the follow-up connector 1, and two mutually parallel fixation members. The fixation members are denoted as a first fixation member 4 and a second fixation member 5, respectively. The follow-up mechanism further comprises an automatic centering device. With reference to FIGS. 4 and 17, the automatic centering device comprises slide portions, balancing elastic members and two mutually parallel fixation members. The slide portions are located on two sides of the follow-up connector 1 and movably connected to the follow-up connector 1, and are denoted as a first slide portion 903 and a second slide portion 904, respectively. The balancing elastic members are symmetrically mounted on the follow-up connector 1, and are denoted as first balancing elastic member 901 and a second balancing elastic member 902, respectively. The first balancing elastic member 901 is movably connected to the first slide portion 903, and the second balancing elastic member 902 is movably connected to the second slide portion 904. The two mutually parallel fixation members are denoted as a third fixation member 905 and a fourth fixation member 906, respectively. Both the third fixation member 905 and the fourth fixation member 906 are in sliding fit with the follow-up connector 1. The first slide portion 903 is movably connected to a first brake pad device 907 of a brake caliper unit, the second slide portion 904 is movably connected to a second brake pad device 908 of the brake caliper unit, and both the first brake pad device 907 and the second brake pad device 908 come into contact with a brake disc 11 during the orbit change of a wheel.

The automatic centering device realizes a balanced state by using the magnitudes of the elastic forces of the balancing elastic members on two sides of the follow-up connector 1. When the balancing elastic member on one side is compressed too much, the balancing elastic member on the other side is relatively stretched, so that the elastic forces generated on two sides are inconsistent. The elastic force pushes the follow-up mechanism to move or causes the brake pad devices reset to central position relative to the wheel. When the follow-up connector 1 is fixed, the first brake pad device 907 or the second brake pad device 908 swings with the wheel; after the wheel is reset, the automatic centering device can automatically reset the first brake pad device 907 or the second brake pad device 908. During the orbit change process, when the follow-up connector 1 can slide on the third fixation member 905 and the fourth fixation member 906, the change of the position of the wheel causes a difference in pressure between the two balancing elastic members. At this time, by using the wheel 10 as a fixed point, the difference in elastic force between the balancing elastic members pushes the follow-up mechanism to slide on the third fixation member 905 and the fourth fixation member 906 until the elastic forces on two sides reach equilibrium again.

Specifically, when the follow-up connector 1 is relatively stationary, i.e., in a locked state, since the wheel will tremble during the running process of the train, a certain offset will be generated in the transverse direction. Thus, the first brake pad device 907 or the second brake pad device 908 will also swing with the wheel. After the wheel is reset, the above mentioned automatic centering device can automatically reset the first brake pad device 907 or the second brake pad device 908.

Moreover, since both the third fixation member 905 and the fourth fixation member 906 are in sliding fit with the follow-up connector 1, the follow-up connector 1 can slide on the third fixation member 905 and the fourth fixation member 906. During the orbit change of the wheel, since the position of the wheel is changed, the follow-up connector 1 generates a displacement, resulting in a difference in pressure between the two balancing elastic members of the automatic centering device associated with the follow-up connector 1. At this time, by taking the wheel 10 as a fixed point, the difference in elastic force between the balancing elastic members pushes the follow-up mechanism to slide on the third fixation member 905 and the fourth fixation member 906 until the elastic forces on two sides reach equilibrium again.

Preferably, the first slide portion 903 and the second slide portion 904 are fitted with the follow-up connector 1 in a manner of hinged connection, slider connection or the like.

Preferably, the automatic centering device is located below as a whole relative to the first unlocking member 2, the second unlocking member 3, the transverse displacement recognition device, the toothed locking and positioning device and the two mutually parallel fixation members of the follow-up mechanism. Specifically, with reference to FIGS. 10, 11 and 14, the first slide portion 903 and the second slide portion 904 are located on two sides of the follow-up connector 1, respectively, and are located below the horizontal planes of the first unlocking member 2 and the second unlocking member 3 in a vertical direction, respectively. The first balancing elastic member 901 is substantially located in a same horizontal plane as the first slide portion 903 and movably connected to the first slide portion 903, and the second balancing elastic member 902 is substantially located on a same horizontal plane as the second slide portion 904 and movably connected to the second slide portion 904. The third fixation member 905 and the fourth fixation member 906 are located below the horizontal planes of the first unlocking member 2 and the second unlocking member 3 in the vertical direction, respectively, and are in sliding fit with the follow-up connector 1.

In addition, it should be understood that the objective of the present application can also be achieved when the automatic centering device is located above as a whole relative to the first unlocking member 2, the second unlocking member 3, the transverse displacement recognition device, the toothed locking and positioning device and the two mutually parallel fixation members of the follow-up mechanism.

In this embodiment, the follow-up mechanism can be symmetrical about the center of the brake disc by the automatic centering device. In a relief state (i.e., in a non-braked state), the clearance between the brake pads and the brake disc can be equalized, thus avoiding a state where the brake pads always being in contact with one side of the brake disc, and the error resulted from the inaccurate position after movement can also be compensated, so that the toothed locking and positioning device is locked at the accurate position.

Figure 15:
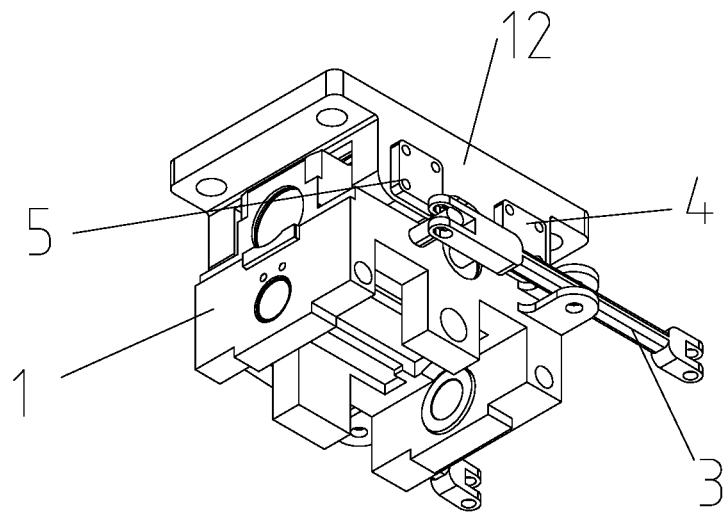
FIG. 15 is a partial assembly diagram of a follow-up connector in accordance with one embodiment of the present application.

To realize the sliding fit between the follow-up connector 1 and the first fixation member 4 and between the follow-up connector 1 and the second fixation member 5, as a preferred design of the above mentioned follow-up mechanism, FIG. 15 shows the follow-up connector 1 to which the first fixation member 4 and the second fixation member 5 are already mounted. With reference to FIGS. 15 and 16, slide holes comprising a first slide hole 103 and a second slide hole 104 are provided at the upper end of the follow-up connector 1, the first slide hole 103 is fitted with the first fixation member 4, and the second slide hole 104 is fitted with the second fixation member 5.

In this preferred design, both the first fixation member 4 and the second fixation member 5 are slide rod structures.

As a preferred design of the above mentioned follow-up mechanism, the first unlocking member 2, the second unlocking member 3, the transverse movement unlocking member 6, the first slide portion 903 and the second slide portion 904 are all rod structures.

As a preferred design of the above mentioned follow-up mechanism, the first displacement recognizing and balancing elastic member 601, the second displacement recognizing and balancing elastic member 602, the locking elastic member 802, the first balancing elastic member 901 and the second balancing elastic member 902 all use springs.

With reference to FIGS. 10 and 16, to realize the sliding fit between the follow-up connector 1 and the third fixation member 905 and between the follow-up connector 1 and the fourth fixation member 906, as a preferred design of the above mentioned follow-up mechanism, slide holes comprising a third slide hole 105 and a fourth slide hole 106 are provided at the lower end of the follow-up connector 1, the third slide hole 105 is fitted with the third fixation member 905, and the fourth slide hole 106 is fitted with the fourth fixation member 906.

In this preferred design, both the third fixation member 905 and the fourth fixation member 906 are slide rod structures.

Figure 11:
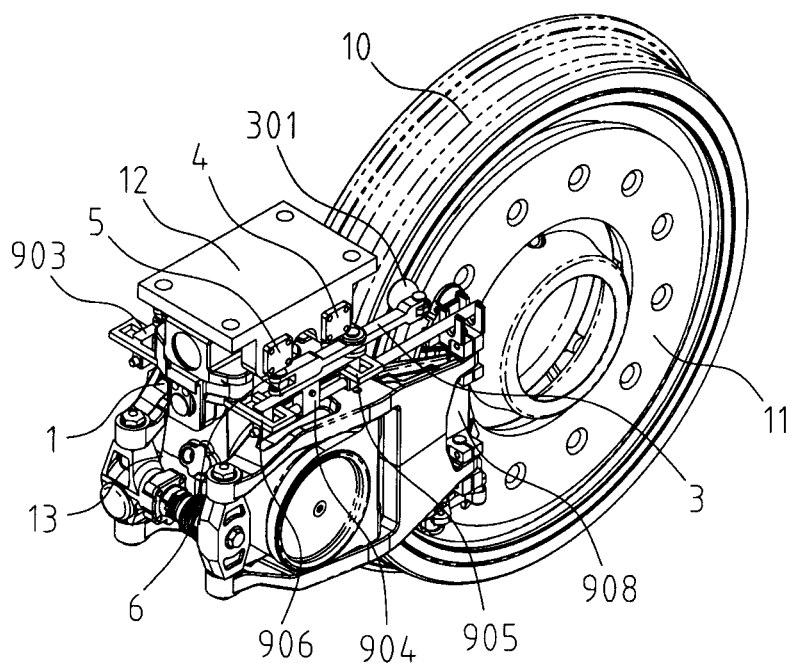

With reference to FIG. 11, to realize the sliding fit between the follow-up connector 1 and the third fixation member 905 and between the follow-up connector 1 and the fourth fixation member 906, as another preferred design of the above mentioned follow-up mechanism, slide slots comprising a first slide slot and a second slide slot are provided at the lower end of the follow-up connector 1, the first slide slot is fitted with the third fixation member 905, and the second slide slot is fitted with the fourth fixation member 906.

In another preferred design, both the third fixation member 905 and the fourth fixation member 906 adopt a chute structure.

As a preferred design of the follow-up mechanism in the above mentioned embodiments, the first slider 201 and the second slider 301 are universal wheels or universal balls.

As a preferred design of the follow-up mechanism in the above mentioned embodiments, the follow-up connector 1 is a follow-up connecting frame or a follow-up connecting plate, other connectors with a connection function may also be used.

Figure 19:
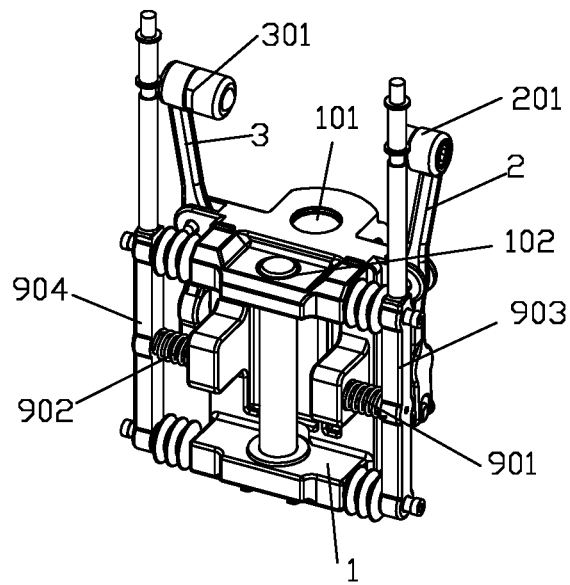

As a preferred design of the follow-up mechanism in the above mentioned embodiments, and with reference to FIGS. 16 and 19, the follow-up connector 1 also has a second longitudinal hole 102, in the second longitudinal hole 102 there is a shaft in clearance fit therewith is mounted, and a brake actuator is associated with the follow-up mechanism through this shaft.

The follow-up connector 1 functions to connect the unlocking members, the toothed locking and positioning device, the fixation members and the automatic centering device of the follow-up mechanism. Thus, during the unlocking or locking process of the follow-up mechanism, the follow-up connector 1 can move along with the activation of the corresponding component so as to drive other associated components to move. As a result, the position of the follow-up mechanism is changed to adapt to the gauge of the wheel after orbit change.

The acting process of the follow-up mechanism during orbit change will be described by taking the follow-up mechanism comprising an automatic centering device as an example, and the specific acting process are shown in FIGS. 5a-9b.

Figure 5A:
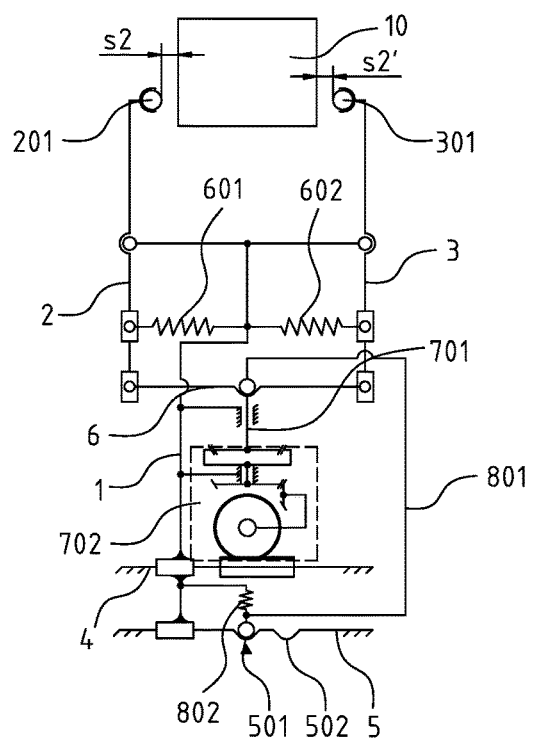
FIGS. 5a and 5b are state diagrams when a follow-up mechanism of the present application and wheels are not in contact before change orbit.
Figure 5B:
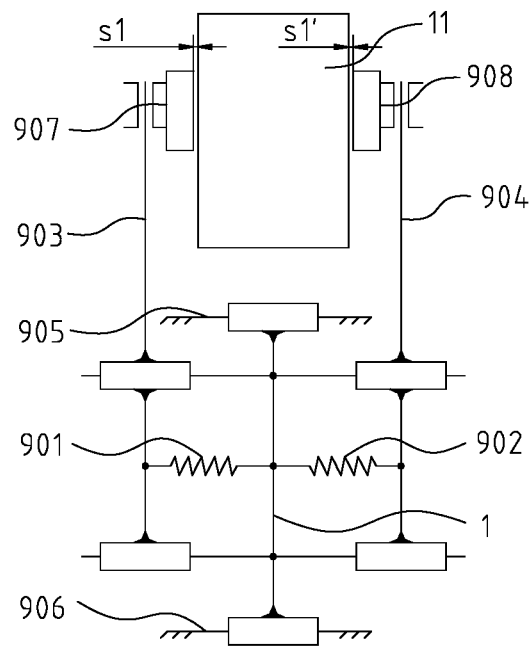

With reference to FIGS. 5a and 5b, the follow-up mechanism does not come into contact with the wheel before orbit change. With reference to FIG. 5b, the clearance between the first brake pad device 907 and the brake disc 11 is s1, and the clearance between the second brake pad device 908 and the brake disc 11 is s1'. With reference to FIG. 5a, the clearance between the first slider 201 and the wheel 10 is s2, the clearance between the second slider 301 and the wheel 10 is s2', and the unlocking positioning member 801 is fitted in the first positioning hole 501 on the left side of the second fixation member 5. Herein, s1=s1', s2=s2', and s2>s1.

Figure 6A:
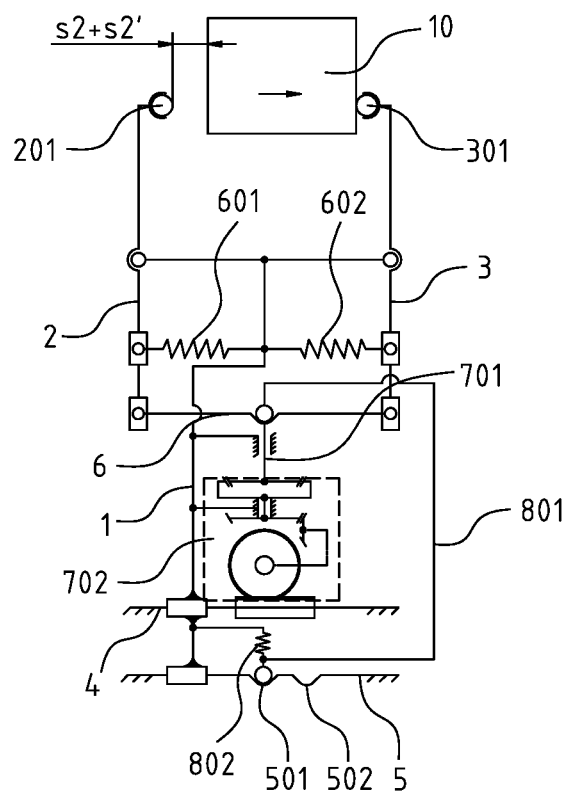
FIGS. 6a and 6b are state diagrams when a follow-up mechanism of the present application and a rim of wheels are in contact.
Figure 6B:
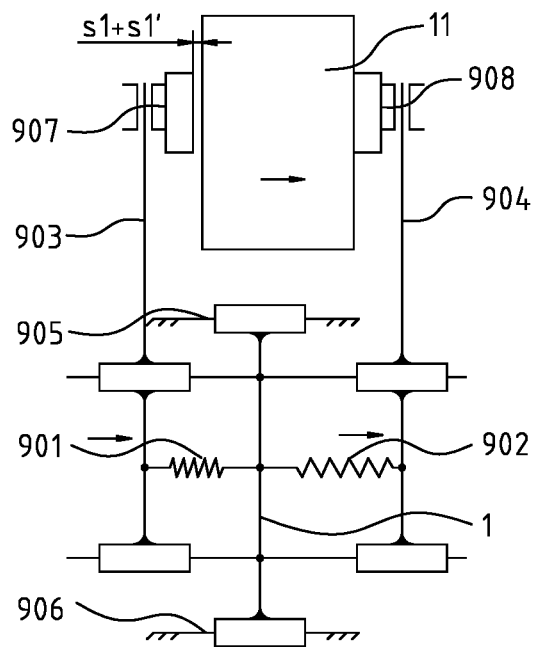

With reference to FIGS. 6a and 6b, the process of changing the orbit to make the follow-up mechanism in contact with the rim of the wheel is shown. With reference to FIG. 6a, the wheel 10 moves in a direction indicated by the arrow. Thus, it can be seen from FIG. 6b that, the clearance between the second brake pad device 908 and the brake disc 11 becomes 0, the clearance between the first brake pad device 907 and the brake disc 11 becomes s1+s1', the second balancing elastic member 902 is stretched, and the first balancing elastic member 901 is compressed. Since s2>s1, the transverse displacement recognition device does not come into contact with the rim at this time. The wheel 10 continues moving, and the brake disc 11, the first brake pad device 907 and the second brake pad device 908 move together in a manner that there is no relative movement between the three. The second balancing elastic member 902 is stretched continuously, and the first balancing elastic member 901 is compressed continuously, until the rim of the wheel 10 comes into contact with the second slider 301. With reference to FIG. 6a, at this time, the clearance between the first slider 201 and the wheel 10 becomes s2+s2', and the follow-up mechanism is still in the locked state.

Figure 7A:
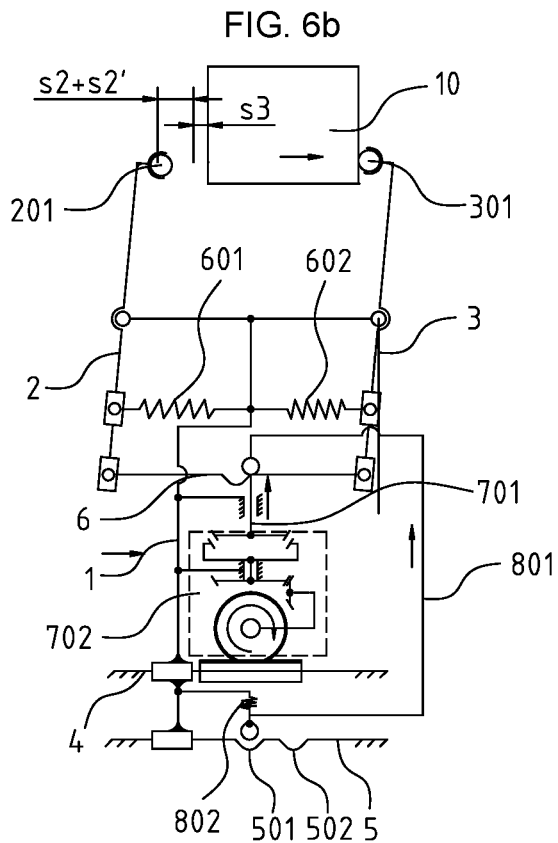
FIGS. 7a and 7b are state diagrams when a follow-up mechanism of the present application starts to move during the orbit change process.
Figure 7B:
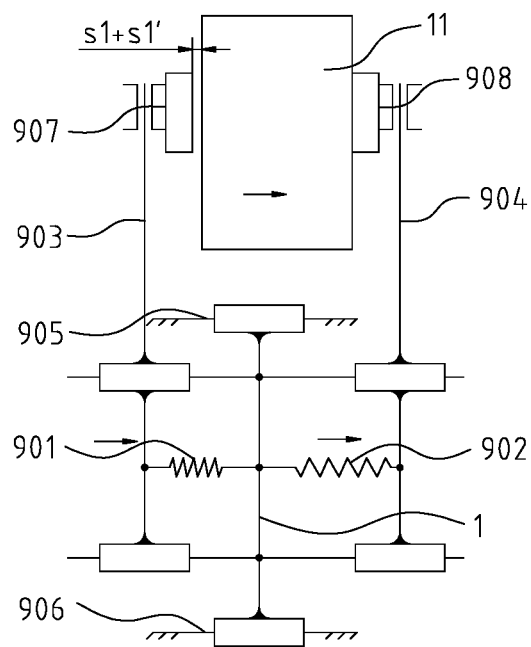

With reference to FIGS. 7a and 7b, the orbit change is unlocked, and the follow-up mechanism starts to move. With reference to FIG. 7a, the wheel 10 continues moving in the direction indicated by the arrow, and the rim of the wheel 10 pushes the second slider 301 and the second unlocking member 3 to rotate about the follow-up connector 1. The second displacement recognizing and balancing elastic member 602 is compressed, and the transverse movement unlocking member 6 moves in a direction opposite to the movement direction of the wheel 10 under the action of the second unlocking member 3. At this time, on one hand, the transverse movement unlocking member 6 pushes the first unlocking member 2 to rotate, the first displacement recognizing and balancing elastic member 601 is stretched, and the clearance between the first slider 201 and the wheel 10 becomes s2+s2'+s3. On the other hand, the transverse movement unlocking member 6 allows the unlocking gear shaft 701 and the unlocking positioning member 801 to move in the shown direction by the cam, so that the unlocking gear shaft 701 is disconnected from the fixed gear shaft system 702, the cam connection of the unlocking positioning member and the second fixation member 5 is disconnected, and the locking elastic member 802 is compressed. After the unlocking gear shaft 701 is disconnected from the fixed gear shaft system 702, the fixed gear shaft system 702 can rotate. The wheel 10 continues moving, the follow-up connector 1 can transverse slide on the first fixation member 4 and the second fixation member 5, and the rack on the first fixation member 4 drives the fixed gear shaft system 702 to rotate to realize the unlocking of the follow-up mechanism. At this time, with reference to FIG. 7b, since the rim of the wheel 10 is already in contact with the second slider 301, the brake disc 11, the first brake pad device 907 and the second brake pad device 908 continue moving together in a manner that there is no relative movement between the three. However, the second balancing elastic member 902 is not stretched any more, and the first balancing elastic member 901 is not compressed any more.

Figure 8A:
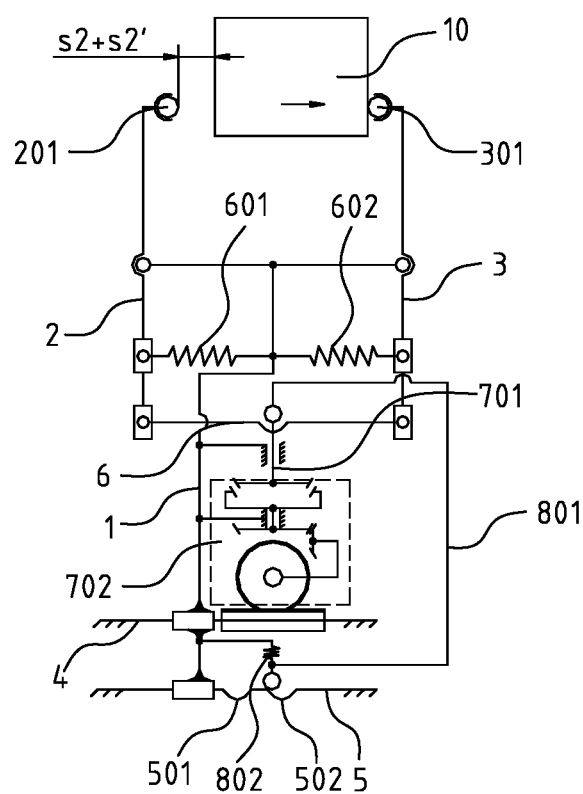
FIGS. 8a and 8b are state diagrams when the follow-up mechanism of the present application moves until the transverse displacement recognition device achieves balance during the orbit change process.
Figure 8B:
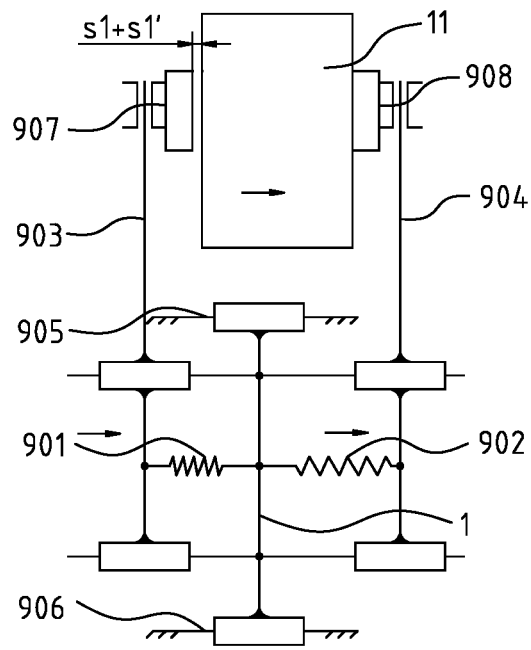

With reference to FIGS. 8a and 8b, during the orbit change process, the follow-up mechanism moves until the transverse displacement recognition device realizes a balanced state. With reference to FIG. 8a, after the wheel 10 reaches the orbit change position, the wheel 10 does not move any more, and the rim of the wheel 10 is still in contact with the second slider 301. At this time, with reference to FIG. 8a, there is a difference in elastic force between the first balancing elastic member 901 and the second balancing elastic member 902 in the automatic centering device. Meanwhile, there is also a difference in elastic force between the first displacement recognizing and balancing elastic member 601 and the second displacement recognizing and balancing elastic member 602 in the transverse displacement recognition device, and the locking elastic member 802 also has a resilience force. Due to these elastic forces, the follow-up connector 1 continues moving to a position where the elastic forces of the first displacement recognizing and balancing elastic member 601 and the second displacement recognizing and balancing elastic member 602 are balanced, i.e., the position shown in FIG. 8a. At this time, with reference to FIG. 8b, since the rim of the wheel 10 is still in contact with the second slider 301, there is still no relative movement among the brake disc 11, the first brake pad device 907 and the second brake pad device 908. The second balancing elastic member 902 is kept in the stretched state, and the first balancing elastic member 901 is kept in the compressed state.

Figure 9A:
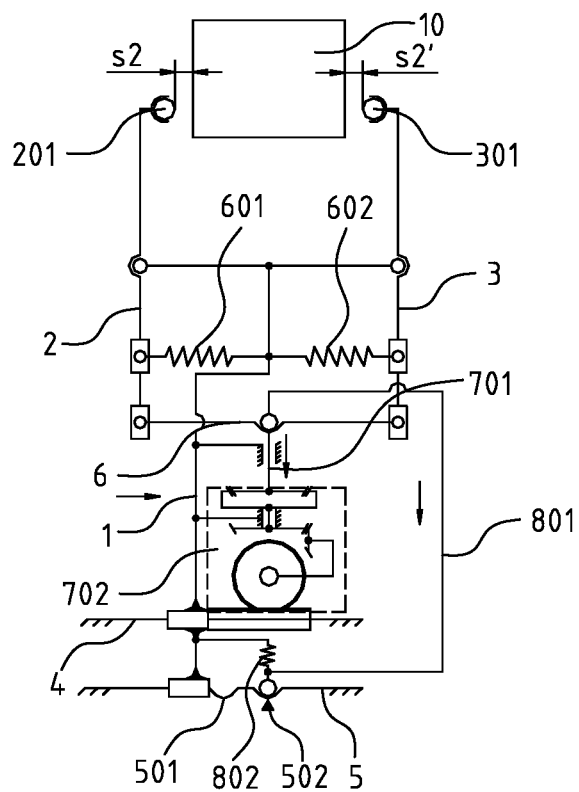
FIGS. 9a and 9b are locking state diagrams when the follow-up mechanism of the present application finishing the automatic centering after change orbit.
Figure 9B:
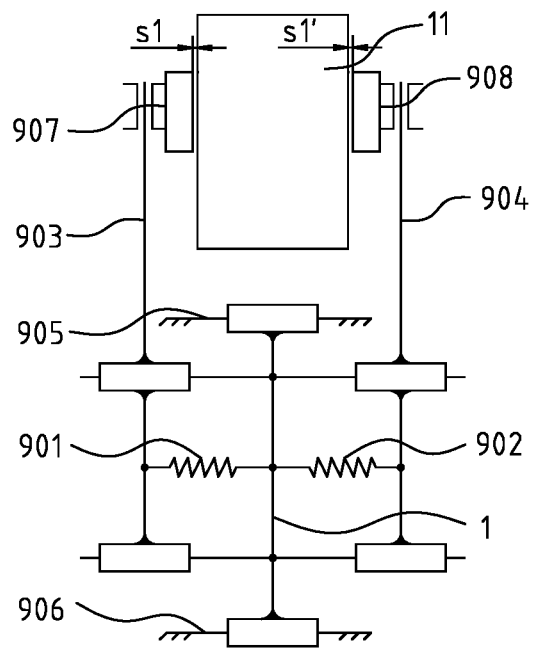

With reference to FIGS. 9a and 9b, the locked state of the orbit change is realized after the follow-up mechanism is automatically centered. Since s2>s1 and s2>s2' at this time, when the elastic forces of the first displacement recognizing and balancing elastic member 601 and the second displacement recognizing and balancing elastic member 602 in the transverse displacement recognition device are in the balanced state, there is still a difference in elastic force between the first balancing elastic member 901 and the second balancing elastic member 902 in the automatic centering device, and the locking elastic member 802 does not reach the centering position, so that the follow-up connector 1 continues moving due to the two elastic forces. At this time, the first displacement recognizing and balancing elastic member 601 and the second displacement recognizing and balancing elastic member 602 are kept in the balanced state and synchronously move transversely with the follow-up connector 1, until the elastic forces of the first balancing elastic member 901 and the second balancing elastic member 902 in the automatic centering device are balanced, and the cam on the unlocking positioning member 801 slides into the second positioning hole 502 on the right side of the second fixation member 5, and the unlocking gear shaft 701 is meshed with the fixed gear shaft system 702 again, thus realizing the change of lifting position.

With reference to FIGS. 10 and 11, an embodiment of the present application provides a brake caliper unit for a gauge-changeable bogie, comprising a mounting bracket 12, a follow-up mechanism and a brake actuator 13. The brake actuator 13 is mounted on the mounting bracket 12. The follow-up mechanism comprises a follow-up connector 1, unlocking members that are located on two sides of the follow-up connector 1 and movably connected to the follow-up connector 1, a transverse displacement recognition device movably connected to the unlocking members, a toothed locking and positioning device mounted on the follow-up connector 1, and two mutually parallel fixation members. The follow-up connector 1 is installed in cooperation with the brake actuator 13. The two mutually parallel fixation members of the follow-up mechanism are fixedly mounted on the mounting bracket 12.

The brake caliper unit provided in this embodiment can automatically recognize the orbit change of a train. The brake caliper unit moves with a wheel by means of the elastic force of the internal elastic members and the coordination with other components. When the brake caliper unit moves to a target gauge position, the brake caliper unit is self-locked at the target gauge position, so as to realize the change in position. During the running of the train, the brake caliper unit can bear a large impact force, and the running safety of the train is improved.

With reference to FIGS. 10 and 11, another embodiment of the present application provides a brake caliper unit for a gauge-changeable bogie, comprising a mounting bracket 12, a follow-up mechanism and a brake actuator 13. The brake actuator 13 is mounted on the mounting bracket 12. The follow-up mechanism comprises a follow-up connector 1, unlocking members that are located on two sides of the follow-up connector 1 and movably connected to the follow-up connector 1, a transverse displacement recognition device movably connected to the unlocking members, a toothed locking and positioning device mounted on the follow-up connector 1, an automatic centering device, and two mutually parallel fixation members. The follow-up connector 1 is installed in cooperation with the brake actuator 13. The two mutually parallel fixation members in the follow-up mechanism are fixedly mounted on the mounting bracket 12. Slide portions of the automatic centering device are movably connected to the brake pad devices.

As a preferred design, the first slide portion 903 is in pin shaft connection with the first brake pad device 907, the second slide portion 904 is in pin shaft connection with the second brake pad device 908, and the first brake pad device 907 and the second brake pad device 908 come into contact with a brake disc 11 during the gauge change process of the wheel.

The brake caliper unit provided in this embodiment can automatically recognize the orbit change of a train. The brake caliper unit moves with a wheel by means of the elastic force of the internal elastic members and the coordination with other components. When the brake caliper unit moves to a target gauge position, the brake caliper unit is self-locked at the target gauge position, so as to realize the change in position, the brake caliper unit can bear a large impact force during the running of the train, and the running safety of the train is improved. The brake caliper unit may be symmetrical about the center of the brake disc. Thus, in a relief state, the clearance between the brake pads and the brake disc can be equalized, avoiding a state where the brake pads always come into contact with one side of the brake disc. The automatic centering mechanism can also compensate for the error resulted from the inaccurate position after movement, so that the toothed locking and positioning device is locked at the accurate position.

In the brake caliper unit provided in the above embodiments, the mounting bracket mainly functions to bear other mechanisms in the brake caliper unit. In addition, the brake caliper unit is assembled with the bogie through the mounting bracket.

In the brake caliper unit provided in the above embodiments, the brake actuator may be in various forms. The following description will be given by taking two brake mechanisms commonly used in railway basic brake devices at present.

Figure 12:
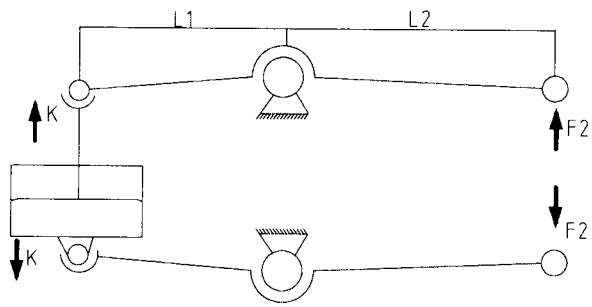
FIG. 12 is a structure diagram of a direct-drive brake actuator of the present application.

With reference to FIG. 12, a direct-drive brake mechanism is shown. This mechanism generates a thrust K by an air cylinder or a hydraulic cylinder. The thrust is transferred to brake pads by levers on two sides (levers L1 and L2 on one side are shown FIG. 12), so that the brake pads are contacted with the brake disc to generate a disc positive pressure F2, so that the brake force is output.

Figure 13:
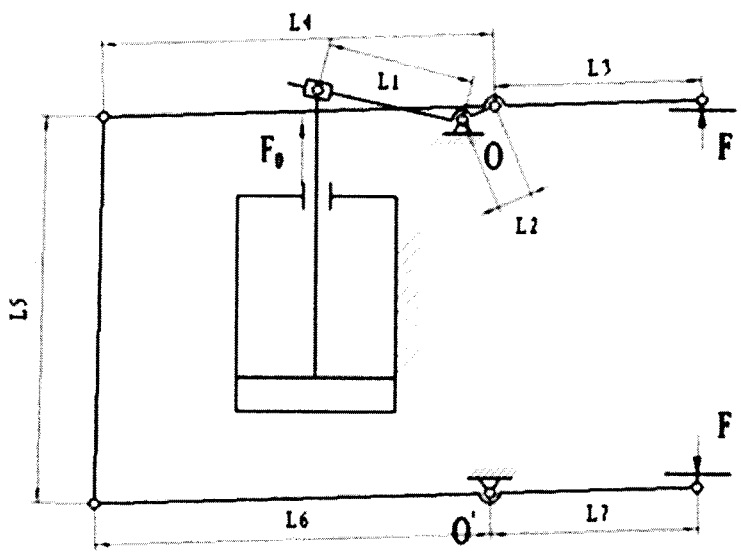
FIG. 13 is a structure diagram of an internal-amplification brake actuator of the present application.

With reference to FIG. 13, an internal-amplification brake actuator is shown. The mechanism generates a thrust FO by a brake cylinder. The thrust FO is amplified by lever amplification mechanisms L1 and L2 using a pivot point as 0 and then transferred to levers L3 and L4, so that the levers L3 and L4 displace in a Y-axis direction (i.e., a vertical direction). A lever L5 is driven to push levers L6 and L7 to rotate about a pivot point 0'. Thus, the brake pads are contact with the brake disc to generate a disc positive pressure F2, so that a brake force is output.

The acting process of the brake caliper unit during orbit change is the same as that of the follow-up mechanism during orbit change, and will not be repeated here.

As a derivative of the embodiments, the number of the fixation members in the automatic centering device is not limited to 2, and may be set as 3, 4 or more, according to actual conditions. Similarly, in the follow-up member, except for the fixation members in the automatic centering device, the number of other fixation members in the follow-up mechanism is also not limited to 2, and may be set as 3, 4 or more, according to actual conditions.

The above embodiments are used to explain the present application, rather than limit the present application. Any modification and change made to the present application within the spirit of the present application and the protection scope of the claims fall into the scope of the present application.

The invention claimed is:

1. A follow-up mechanism, comprising a follow-up connector, unlocking members that are located on two sides of the follow-up connector and movably connected to the follow-up connector, a transverse displacement recognition device movably connected to the unlocking members, a toothed locking and positioning device mounted on the follow-up connector, and at least two mutually parallel fixation members; the follow-up connector is in sliding fit with the fixation members, and sliders are fixedly connected at ends of the unlocking members; the transverse displacement recognition device comprises a transverse movement unlocking member and two displacement recognizing and balancing elastic members symmetrically mounted on the follow-up connector; the toothed locking and positioning device comprises a toothed locking element movably connected to the transverse movement unlocking member and a positioning element connected to the toothed locking element; the toothed locking element is movably connected to a first fixation member of the fixation members, and the positioning element is movably connected to a second fixation member of the fixation members.

2. The follow-up mechanism of claim 1, wherein, two ends of the transverse movement unlocking member are in slider hinge connection with or in cam connection with a first unlocking member and a second unlocking member of the unlocking members, respectively; a first displacement recognizing and balancing elastic member of the displacement recognizing and balancing elastic members is in slider hinge connection with or in cam connection with the first unlocking member; and a second displacement recognizing and balancing elastic member of the displacement recognizing and balancing elastic members is in slider hinge connection with or in cam connection with the second unlocking member.

3. The follow-up mechanism of claim 1, wherein the toothed locking element comprises an unlocking gear shaft in cam connection with the transverse movement unlocking member and a fixed gear shaft system meshed with the unlocking gear shaft; the first fixation member is a fixation member with a rack, and the fixed gear shaft system is meshed with the first fixation member.

4. The follow-up mechanism of claim 2, wherein the toothed locking element comprises an unlocking gear shaft in cam connection with the transverse movement unlocking member and a fixed gear shaft system meshed with the unlocking gear shaft; the first fixation member is a fixation member with a rack, and the fixed gear shaft system is meshed with the first fixation member.

5. The follow-up mechanism of claim 3, wherein, the positioning element comprises an unlocking positioning member fixedly connected to the unlocking gear shaft and a locking elastic member connected to the unlocking positioning member, the second fixation member is a fixation member with a positioning hole, the unlocking positioning member is in cam connection with the second fixation member.

6. The follow-up mechanism of claim 4, wherein, the positioning element comprises an unlocking positioning member fixedly connected to the unlocking gear shaft and a locking elastic member connected to the unlocking positioning member, the second fixation member is a fixation member with a positioning hole, the unlocking positioning member is in cam connection with the second fixation member.

7. The follow-up mechanism of claim 1, further comprising an automatic centering device, the automatic centering device comprises slide portions located on two sides of the follow-up connector and movably connected to the follow-up connector, balancing elastic members symmetrically mounted on the follow-up connector, and at least two mutually parallel fixation members; a first balancing elastic member of the balancing elastic members is movably connected to a first slide portion of the slide portions, a second balancing elastic member of the balancing elastic members is movably connected to a second slide portion of the slide portions; the automatic centering device is in sliding fit with the follow-up connector.

8. A brake caliper unit for gauge-changeable bogie comprising a mounting bracket and a brake actuator, the brake actuator is mounted on the mounting bracket, further comprising the follow-up mechanism of claim 1, wherein the follow-up connector is installed in cooperation with the brake actuator, the fixation members are fixedly mounted on the mounting bracket.

9. A brake caliper unit for gauge-changeable bogie comprising a mounting bracket and a brake actuator, the brake actuator is mounted on the mounting bracket, further comprising the follow-up mechanism of claim 2, wherein the follow-up connector is installed in cooperation with the brake actuator, the fixation members are fixedly mounted on the mounting bracket.

10. A brake caliper unit for gauge-changeable bogie comprising a mounting bracket and a brake actuator, the brake actuator is mounted on the mounting bracket, further comprising the follow-up mechanism of claim 3, wherein the follow-up connector is installed in cooperation with the brake actuator, the fixation members are fixedly mounted on the mounting bracket.

11. A brake caliper unit for gauge-changeable bogie comprising a mounting bracket and a brake actuator, the brake actuator is mounted on the mounting bracket, further comprising the follow-up mechanism of claim 4, wherein the follow-up connector is installed in cooperation with the brake actuator, the fixation members are fixedly mounted on the mounting bracket.

12. A brake caliper unit for gauge-changeable bogie comprising a mounting bracket and a brake actuator, the brake actuator is mounted on the mounting bracket, further comprising the follow-up mechanism of claim 5, wherein the follow-up connector is installed in cooperation with the brake actuator, the fixation members are fixedly mounted on the mounting bracket.

13. A brake caliper unit for gauge-changeable bogie comprising a mounting bracket and a brake actuator, the brake actuator is mounted on the mounting bracket, further comprising the follow-up mechanism of claim 6, wherein the follow-up connector is installed in cooperation with the brake actuator, the fixation members are fixedly mounted on the mounting bracket.

14. A brake caliper unit for gauge-changeable bogie comprising a mounting bracket and a brake actuator, the brake actuator is mounted on the mounting bracket, further comprising the follow-up mechanism of claim 7, wherein the follow-up mechanism is installed in cooperation with the brake actuator, the fixation members of the follow-up connector are fixedly mounted on the mounting bracket, the slide portions are movably connected to brake pad devices.

* * * * *